United States Patent [19]

Tsushima et al.

[11] Patent Number: 4,696,581
[45] Date of Patent: Sep. 29, 1987

[54] ROLLING BEARING

[75] Inventors: Noriyuki Tsushima, Kuwana; Hirokazu Nakajima, Gifu, both of Japan

[73] Assignee: NTN Toyo Bearing Co., Ltd., Osaka, Japan

[21] Appl. No.: 936,860

[22] Filed: Dec. 2, 1986

[30] Foreign Application Priority Data

Dec. 3, 1985 [JP] Japan .................................. 60-273078

[51] Int. Cl.⁴ ........................ F16C 33/34; F16C 33/62
[52] U.S. Cl. .................... 384/565; 384/491; 384/492; 384/569; 384/625
[58] Field of Search ............... 384/625, 492, 491, 565, 384/95, 619, 622

[56] References Cited

U.S. PATENT DOCUMENTS

| | | | |
|---|---|---|---|
| 3,275,389 | 9/1966 | Neilson et al. | 384/625 |
| 3,734,582 | 5/1973 | Beauchet | 384/492 |
| 3,751,123 | 8/1973 | Parker | 384/492 |
| 4,240,682 | 12/1980 | Benson | 384/625 |

Primary Examiner—Lenard A. Footland
Attorney, Agent, or Firm—Armstrong, Nikaido, Marmelstein & Kubovcik

[57] ABSTRACT

An improved rolling bearing is proposed which has a longer life under heavy load and under lubrication with oil containing foreign matters. Its bearing rings and rolling elements are made of carburized steel having an oxygen content of 15 PPM or less and have a deeper surface hardened layer and a higher core hardness. It has a longer life even under lubrication with oil containing foreign matters.

1 Claim, 11 Drawing Figures

Test conditions
Bearing tested     : 30206
Radial load        : 1800kgf $\left(\frac{Cr}{Pr}=2.19\right)$
No. of revolutions : 2000rpm
Lubrication        : Oil bath, Turbine oil#56
Dust               : Iron powder 0.3mm or less, 0.03g/l Test conditions
Bearing tested : 30305
Radial load : 1100kgf $\left(\frac{Cr}{Pr}=4.05\right)$
No. of revolutions: 2000rpm
Lubrication : Oil bath, Turbine oil#56
Dust : Iron powder 0.3mm or less, 6.7g/l Test conditions
Bearing tested    : 30206
Radial load       : 1800kgf
No. of revolutions: 2000rpm
Lubrication       : Oil circulation lubrication,
                    Turbine oil#56 (20μm filter)

Figures in parentheses denote core hardness (HRC)

ROLLING BEARING

The present invention relates to a rolling bearing, more specifically to a rolling bearing which has a long life even under heavy load and under lubrication with oil containing foreign matters.

Carburized steel used as a material for rolling bearings has a longer rolling fatigue life than through hardened bearing steel. So bearings made of carburized steel have been put to a practical use as a long-life bearing.

It is thought that the long life of the carburized steel bearing results from the fact that a large amount of retained austenite is produced in the surface layer by carburization and that there exists compressive residual stress in the surface layer.

In other words, many nonmetallic inclusions which act as the source of stress concentration exist in conventional steel materials, and the compressive residual stress and retained austenite produced by carburization function to relax the stress concentration.

But, with a recent progress of steel manufacturing technology, the quality of steel has greatly improved. This has caused change in behavior of steel. Table 1 shows the change in the rolling fatigue life of through hardened bearing steels with the change in the year of manufacture. Table 1 shows the results of life tests conducted annually under fixed conditions for test pieces made of the through hardened bearing steels which were made in the years shown in the table. As will be seen, for steel made in 1960's, the rolling fatigue life of carburized steel had about twice as long a life as that of through hardened bearing steel. But, its difference is diminishing. In 1983-1984, the life of carburized steel was about 1.2 times that of through hardened bearing steel.

zation (on the improvement in rolling fatigue life) will be lost.

In contrast, the test pieces made of recently produced carburized steel (1983-1984) were put to the same tests. The results are shown in FIGS. 4 and 5. The results are completely different from the results shown in FIGS. 1 and 2. Namely, in the tests, the deeper the case depth was and the higher the core hardness was, the longer the life. This probably results from the fact that nonmetallic inclusions acting as the source of stress concentration do not exist and the effect of compressive residual stress and retained austenite on stress concentration relaxation is smaller than before.

As will be seen from Table 1, a bearing made of carburized steel as a long-life material shows a longer life than a bearing made of through hardened bearing steel under lubrication with clean oil. But, it cannot exhibit a long life if it is used under lubrication with oil in which foreign matters such as wear debris of gears are mixed as in an automobile transmission.

Several special heat treatments are known as means for obtaining a bearing made of through hardened bearing steel and having a long life even under lubrication with oil containing foreign matters. Among such means, there are so-called marstressing in which nitrogen is charged into the surface layer while heating the steel for quenching, and the heat treatment for decreasing the sensitiveness to cracks by controlling the cooling speed during quenching. The former heat treatment would increase retained austenite too much and lower the hardness, when applied to carburized steel. The latter heat treatment has been proved to have not a sufficient effect for carburized steel as a result of life tests.

It is thought that the decline in life for carburized steel bearings under the lubrication with oil containing foreign matters is caused by other factors than the sensi-

TABLE 1

| Kind of steel | 10% life (× 10⁴) | When manufactured | | | | |
|---|---|---|---|---|---|---|
| | | 1961-1966 | 1967-1971 | 1972-1976 | 1977-1982 | 1983-1984 |
| Through hardened bearing steel SUJ 2 | Range Median Lot number | 680-2120 990 (n = 9) | 459-2760 1430 (n = 28) | 678-3620 1510 (n = 28) | 1310-2930 2170 (n = 23) | 1790-11900 5390 (n = 10) |
| Carburized steel SCr 420 | Range Median Lot number | — | 1250-4460 2710 (n = 19) | 1800-4000 2810 (n = 11) | 2930-4680 3470 (n = 7) | 5420-10500 6620 (n = 3) |

FIG. 1 shows the relation between the case depth (to HRC 50) of carburization and the life for the carburized steel. FIG. 2 shows the relation between the core hardness and the life for the carburized steel. The test piece used was carburized steel made in the first half of 1970's. The graph shows that there is an optimum value for the case depth of carburization and if the case depth is shallower or deeper than the optimum value, the rolling fatigue life will be shorter.

FIG. 3 shows the relation between the shearing stress distributions in the direction of depth for each contact stress and the proper hardness distribution. The rolling fatigue is generated by shearing stress produced in the surface layer by contact stress. Therefore, a carburized steel should have a hardness distribution similar to its shearing stress distribution. The case depth of carburization should be deep to a certain extent, but, if it is too deep, the life will be short. Also, the higher the core hardness, the shorter the life is. (FIG. 2) This is probably due to the fact that the compressive residual stress in the surface layer will be small and the effect of carburitiveness to cracks, presumably by the influence of large residual compressive stress generated in the surface layer in use.

It is an object of the present invention to provide a bearing which has a long life even under lubrication with oil containing foreign matters in view of the change in properties of carburized steels with the advancement of steel manufacturing technology.

In accordance with the present invention, there is provided a rolling bearing comprising outer and inner bearing rings and a plurality of rolling elements disposed between the inner and outer bearing rings, the bearing rings and the rolling elements being made of carburized steel having an oxygen content of not more than 15 PPM and a carbon content of 0.15 to 0.4 percent, the bearing rings and the rolling elements having a surface hardened layer which has a hardness of not less than 58 in HRC and having a core hardness of not less than 48 and not more than 58 in HRC, the depth of the surface hardened layer being not less than 0.05 for the bearing rings and not less than 0.07 for the rolling elements in terms of depth/diameter of the rolling element.

In the present invention, carburized steels having a carbon content of 0.15% to about 0.3% and medium-carbon carburized steel having a carbon content of about 0.3% to 0.4% are employed. Such steels are referred to as carburized steel in this invention.

In the present invention, a deep hardened layer is provided on the surfaces of the bearing rings and the rolling elements by carburization, and a hardness as high as 48 to 58 HRC is given to the core. As a result, the amount of retained austenite in the surface hardened layer is about the same as in a conventional carburization whereas the compressive residual stress decreases. As mentioned below, the influence of foreign matters in the lubricating oil on the fairly deep inside of the material decreases, so that a substantial drop in the life of the bearing can be avoided under lubrication with oil containing foreign matters.

Other objects and features of the present invention will become apparent from the following description taken with reference to the accompanying drawings, in which.

Figure 1:
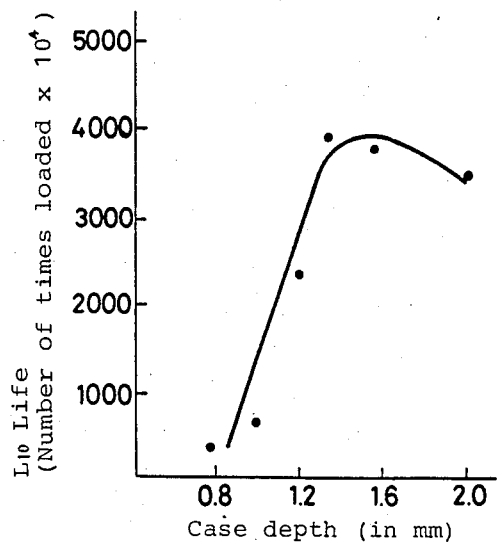
FIG. 1 is a graph showing the relation between the depth of carburization (case depth) and the life for test pieces made of carburized steels made in the early half of 1970's.
Figure 2:
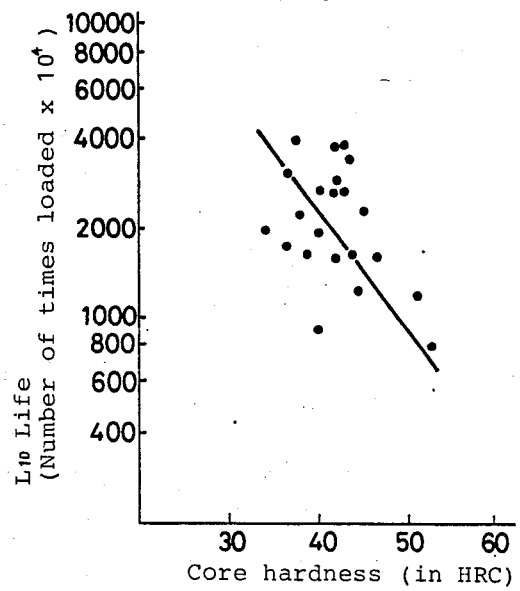
FIG. 2 is a graph showing the relation between the core hardness and the life of test pieces made of carburized steels made in the early half of 1970's.
Figure 3:
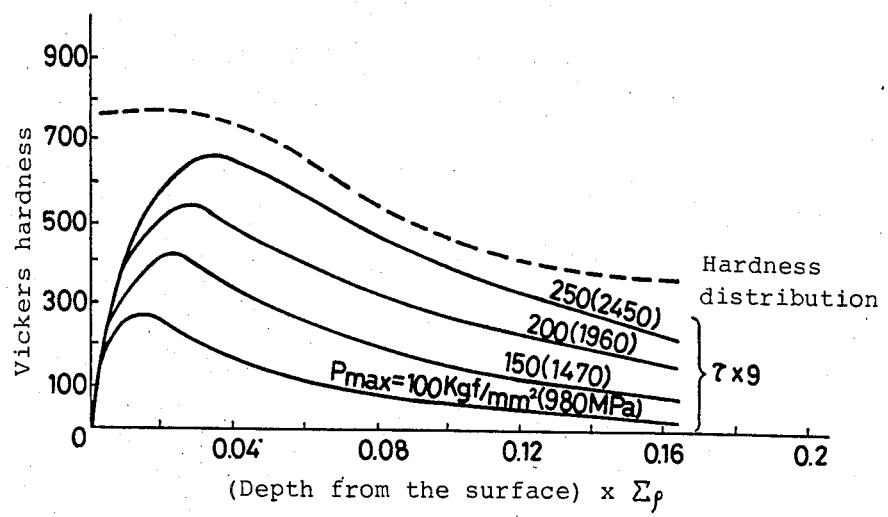
FIG. 3 is a graph showing the relation between the distribution of shearing stress and that of the proper hardness.
Figure 4:
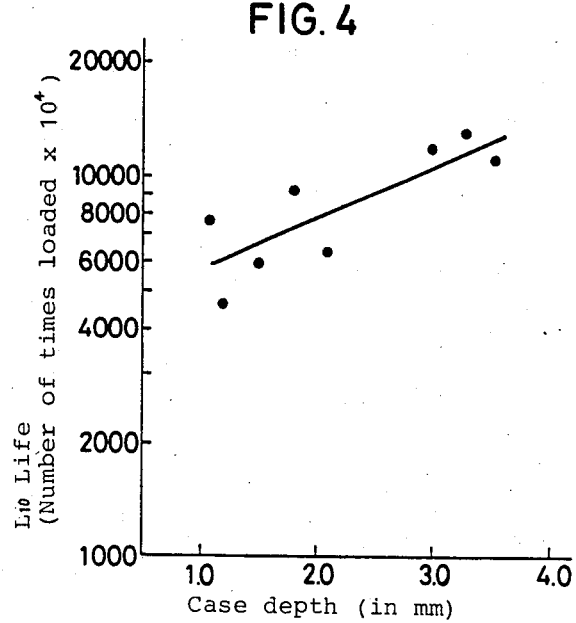
FIG. 4 is a graph showing the relation between the life and the depth of carburization of test pieces made of carburized steels made in 1983-1984.
Figure 5:
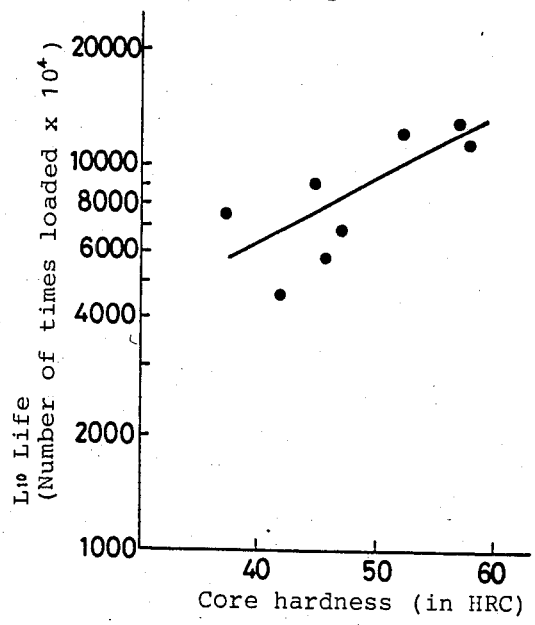
FIG. 5 is a graph showing the relation between the core hardness and the life of the same test pieces as in FIG. 4.
Figure 6:
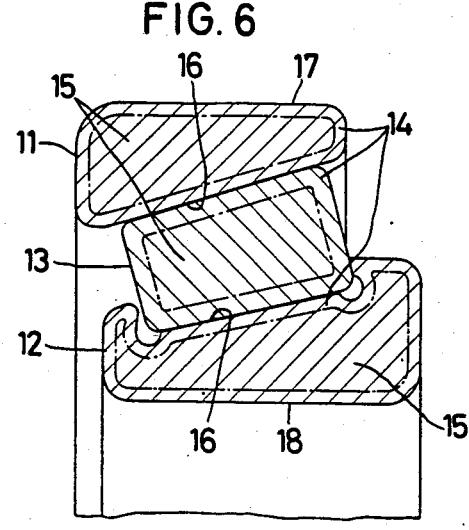
FIG. 6 is a sectional view of a bearing processed with carburization treatment.

The bearing in accordance with the present invention is made of carburized steel and comprises bearing rings 11, 12 and rolling elements 13 interposed between these rings. (FIG. 6) The bearing rings 11, 12 and the rolling elements 13 are subjected to carburization to obtain a long life under lubrication with oil containing foreign matters.

Carburization provides a surface hardened layer 14. The hardness of each core 15 is set to not less than HRC 48 and not more than 58, preferably to HRC 48-55.

The carburized steel used for the bearing rings 11, 12 and the rolling elements 13 should have an oxygen content of not more than 15 PPM, preferably not more than 12 PPM, and a carbon content of 0.25-0.35%.

The depth of the surface hardened layer should be determined according to the wall thicknesses of the bearing rings 11, 12 and the diameter of the rolling elements 13.

The depth of the surface hardened layer 14 for the bearing rings 11 and 12 should be 0.05 or more in terms of depth to diameter of rolling element and that for the rolling elements 13 should be 0.07 or more.

Under lubrication with oil containing foreign matters, a large compressive residual stress develops in the rolling surface layers of the bearing rings 11, 12 and the rolling elements 13. Measurements by an X-ray of the residual stress after use reveal that the influence of the foreign matters reaches a fairly deep inside under high load. In other words, it is thought that on account of the influence of residual compressive stress (hereinafter referred to as "contact residual stress") produced in the surface layer by the contact stress during use, and vibration or temperature rise caused by operation under lubrication with oil containing foreign matters, the shearing stress value (hereinafter referred to as "critical shearing stress") resisting the yielding of materials lowers. It is acknowledged that the area where the contact residual stress is produced reaches to a substantial depth (e.g. 0.5 mm deep or more). A decrease in the critical shearing stress relatively means a decrease in a substantial hardness of the material. Therefore, it is necessary to set the depth of the surface hardened layer 14 to the above value. Further the hardness of the layer should be about the same as that of the through hardened bearing steel, e.g. HRC 60 or more.

While the bearing rings are influenced only from the rolling surface 16, not from an outer periphery 17, (in case of an outer race) or from an inner periphery 18 (in case of an inner race), the rolling elements 13 are affected from both sides. Thus, the surface hardened layer of the rolling element is required to be deeper than that of the bearing ring.

Figure 7:
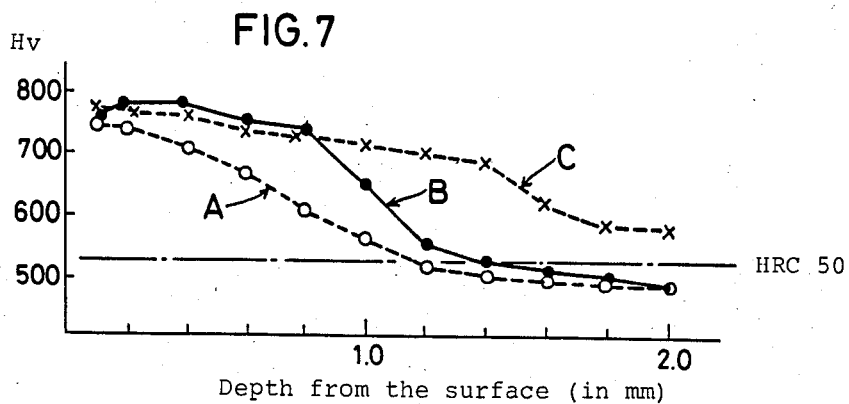
FIG. 7 is a graph showing the relation between the hardness and the depth for test piece bearings.

In order to check the influence of the hardness distribution on the life of the materials under lubrication with oil containing foreign matters, life tests were conducted for three kinds of test pieces of bearings made of carburized steel having different hardness distributions as shown in FIG. 7. As shown in Table 2, it was proved that the test piece bearing C had the longest life.

The test results show that what is important is not only the depth of the surface hardened layer but the hardness of the core. It is generally thought that a sudden change in hardness distribution produces an evil effect on the strength. The difference in life between the test piece bearings B and C is thought to be caused for the abovesaid reason. But, it also seems to be necessary to provide a sufficient hardness to the core to counteract the tensile residual stress produced in the core in response to a large contact residual stress (compressive stress) which develops in the surface layer. Thus, by increasing the depth of the surface hardened layer and increasing the hardness of the core, a long life can be realized under lubrication with oil containing foreign matters.

TABLE 2

| (Lubrication with oil containing foreign matters) | |
|---|---|
| | 10% life |
| Bearing A | 92 hours |
| Bearing B | 120 hours |
| Bearing C | 339 hours |

TABLE 3

| (Lubrication with clean oil) | |
|---|---|
| | 10% life |
| Bearing A | 671 hours |
| Bearing B | 700 hours |
| Bearing C | 800 hours |

Figure 8:
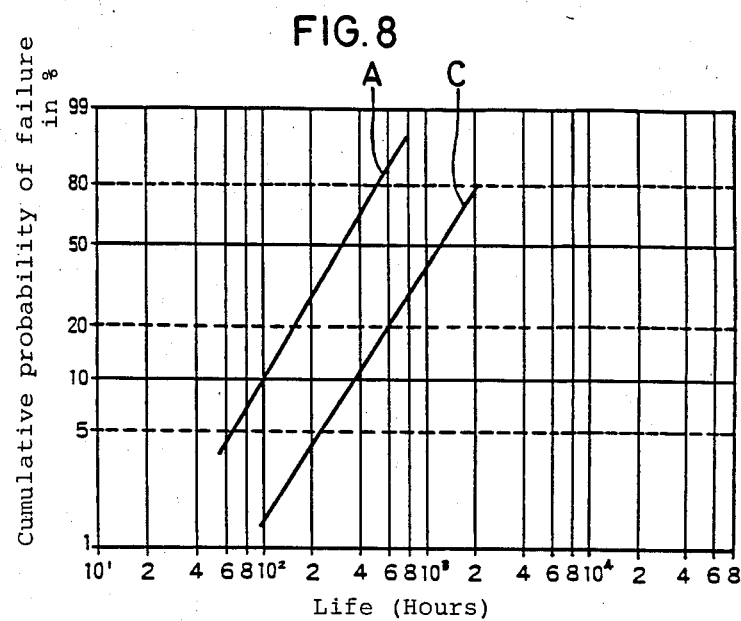
FIGS. 8-10 are Weibull distribution graphs showing the result of life tests.
Figure 9:
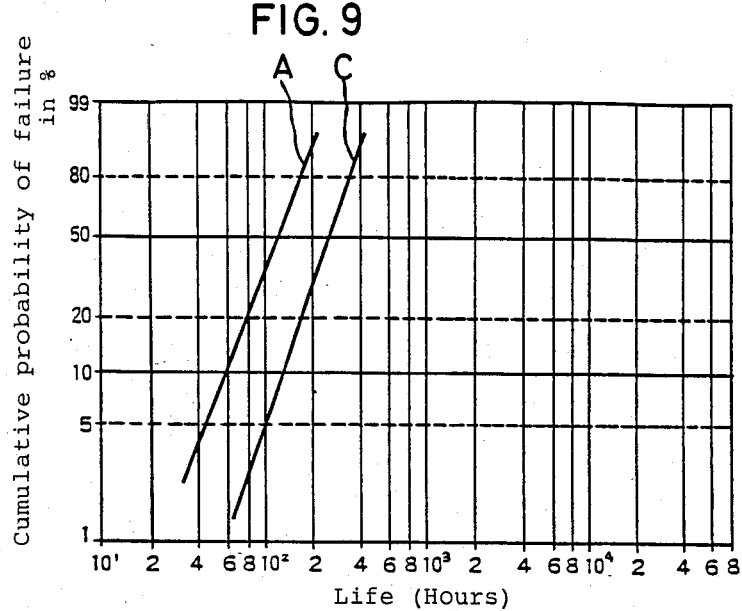
Figure 10:
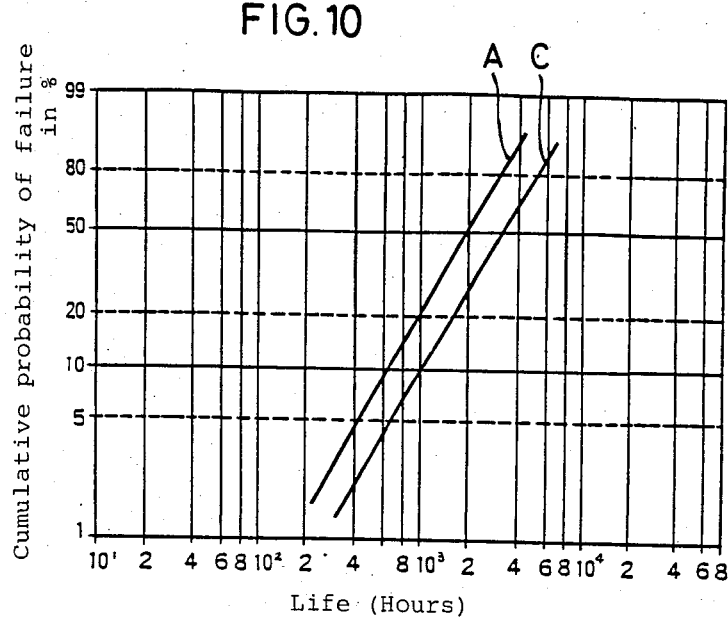

FIGS. 8 to 10 illustrate the results of an endurance test in which a tapered roller bearing A (core hardness; HRC 40-45) made of carburized steel which was subjected to a conventional carburization, and a tapered roller bearing C made of carburized steel in accordance with the present invention were tested for endurance under three different conditions. Under any one of the above conditions the bearing C had the longest life.

As seen from the results of the life test (Table 3) for the test piece bearings A, B and C shown in FIG. 7, the test piece bearing C showed the longest life under lubrication with clean oil although the difference was not so large as under lubrication with oil in which foreign matters are mixed.

Figure 11:
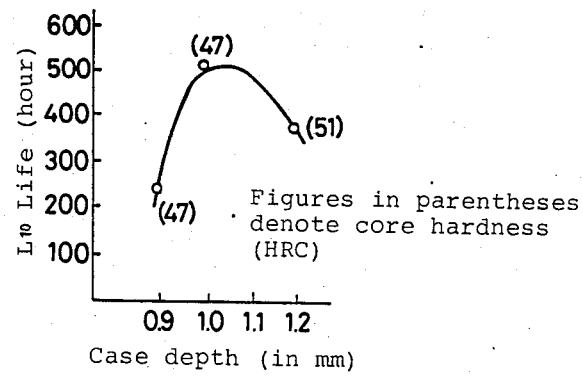
FIG. 11 is a graph showing the relation between the core hardness and the life of a bearing made of carburized steels made in the early half of 1970's.

This test results in which the test piece bearing C exhibited the longest life differ from the results of a life test conducted for bearings made of carburized steel produced in the early half of 1970's shown in FIG. 11, which shows that a bearing having a high core hardness has a short life.

If highly pure carburized steel having an oxygen content of 15 PPM or less is used, by making its surface hardened layer deeper and increasing its core hardness, a bearing having a long life even under lubrication with a clean oil can be obtained.

In accordance with this invention, bearing rings and rolling elements made of carburized steel having an oxygen content of 15 PPM or less have a deeper surface hardened layer and a high core hardness. Thus, they not only withstand prolonged use under lubrication with clean oil, but can reduce the extent of plastic deformation produced in the surface layer by coping with the decrease in critical shearing stress due to the development of a large contact residual stress in the surface layer, vibrations or temperature rise caused under lubrication with oil containing foreign matters. They can have a long life not only under lubrication with clean oil but under a heavy load or under lubrication with oil containing foreign matters also by avoiding an abrupt change in the hardness distribution.

We claim:

1. A rolling bearing comprising outer and inner bearing rings and a plurality of rolling elements disposed between said inner and outer bearing rings, said bearing rings and said rolling elements being made of carburized steel having an oxygen content of not more than 15 PPM and a carbon content of 0.15 to 0.4 percent, said bearing rings and said rolling elements having a surface hardened layer which has a hardness of not less than 58 in HRC and having a core hardness of not less than 48 and not more than 58 in HRC, the depth of said surface hardened layer being not less than 0.05 for said bearing rings and not less than 0.07 for said rolling elements in terms of depth/diameter of said rolling element.

* * * * *